United States Patent
Nijemcevic et al.

(10) Patent No.: US 6,865,602 B1
(45) Date of Patent: Mar. 8, 2005

(54) NETWORK MANAGEMENT SUPPORT FOR OAM FUNCTIONALITY AND METHOD THEREFORE

(75) Inventors: Sasa Nijemcevic, Nepean (CA); Qihua Wang, Nepean (CA)

(73) Assignee: Alcatel Canada Inc., Kanata (CA)

( * ) Notice: Subject to any disclaimer, the term of this patent is extended or adjusted under 35 U.S.C. 154(b) by 587 days.

(21) Appl. No.: 09/624,756

(22) Filed: Jul. 24, 2000

(51) Int. Cl.$^7$ .............................................. G06F 15/173
(52) U.S. Cl. ...................... 709/223; 709/224; 709/220; 709/225; 709/227; 709/217; 345/734; 345/735; 370/241.1
(58) Field of Search ................................ 709/220, 224, 709/225, 203, 217, 218, 223; 345/734, 735, 736; 704/224, 223, 220, 217, 227; 370/241.1

(56) References Cited

U.S. PATENT DOCUMENTS

| | | | |
|---|---|---|---|
| 5,751,965 A | | 5/1998 | Mayo et al. |
| 6,115,743 A | * | 9/2000 | Cowan et al. ............... 709/224 |
| 6,212,559 B1 | * | 4/2001 | Bixler et al. ................ 709/221 |

FOREIGN PATENT DOCUMENTS

| | | |
|---|---|---|
| EP | 0 702 495 A1 | 3/1996 |
| EP | 0 849 912 A2 | 6/1998 |
| EP | 0 849 912 A3 | 2/1999 |
| EP | 0 899 913 A2 | 3/1999 |
| EP | 0 899 913 A3 | 4/2000 |

OTHER PUBLICATIONS

Farkouh, Stephen, "Managing ATM–based Broadband Networks" May 1993, IEEE Communications Magazine No. 5, pp. 82–86.*
Hans–Jurgen Breuer, ATM–Layer OAM: Principles and Open Issues, Article, IEEE Communications Magazine, pp. 75–78, Sep. 29, (1991), No. 9, New York, New York, USA.
Kim, et al., A Hybrid Performance Management Scheme for OAM Function . . . , Article, IEEE, Aug. 1997, pp. 251–255, USA.
Smith, et al., HP Open View Windows: A User Interface . . . , HP Journal, Apr., 1990, pp. 60–65, XP009006768, USA.
Stephen C. Farkouh, Managing ATM–based Broadband Networks, IEEE Communications Magazine, pp. 82–86, May 31, (1993), No. 5, New York, New York, USA.

* cited by examiner

Primary Examiner—Frantz B. Jean
Assistant Examiner—Kevin Parton

(57) ABSTRACT

A method and apparatus for network management support of OAM functionality in a communication network is presented. The network manager receives OAM configuration information for a segment that includes a plurality of path points. For each path point of the plurality of path points, the network manager determines, based on the configuration of the network, if the path point is to serve as an OAM source or sink for the desired OAM functional path. Based on this determination, the network manager generates OAM configuration commands for the selected path points that are to serve as OAM sources and sinks. These OAM configuration commands are then provided to the corresponding path points such that the appropriate OAM sources and sinks are established.

33 Claims, 5 Drawing Sheets

NETWORK MANAGEMENT SUPPORT FOR OAM FUNCTIONALITY AND METHOD THEREFORE

BACKGROUND OF THE INVENTION

Operation and Management (OAM) cells are commonly used in asynchronous transfer mode (ATM) communication networks for various diagnostic purposes. Two different types of OAM functionality are generally supported. OAM continuity checking is used to determine whether or not cells are making their way along a defined path, or connection. OAM performance monitoring collects and maintains statistics regarding a particular path, or connection that has been selected for monitoring.

Some communication networks may include nodes or cards that support OAM functionality as well as nodes or cards that do not support OAM functionality. In prior art systems, manual configuration of each node on an individual basis is required in order to provide for OAM diagnostic information collection within the network. Such manual configuration can include configuring a particular OAM compatible card to act as an OAM cell source, as well as configuring another OAM compatible card to act as an OAM cell sink. OAM cell sources inject OAM cells into the dataflow within the network, and OAM sink point extract these cells from the dataflow for analysis.

In prior art systems, OAM continuity checking functionality is only supported when both endpoints of the path or link correspond to line cards within nodes that support OAM continuity check functionality. Furthermore, the entire path over which continuity checking is desired cannot contain Inter-Carrier Interfaces, which terminate OAM cells, in order for such prior art solutions to provide any level of continuity check functionality.

Additional limitations with prior art OAM support are realized when a fault or other problem within the network results in re-routing of a particular call or path. If OAM functionality was supported over the path prior to the need for re-routing, the user must once again manually add the appropriate OAM source and sink points along the newly-routed path once the user has been notified of such a routing change. Furthermore, the user may have to deactivate prior source and sink points to ensure that they do not interfere with future OAM verification that is established using nodes that were included in the prior paths.

In addition to the difficulties associated with configuring OAM cell functionality within prior art systems, little support for visual representation of OAM segments is available in such prior art systems. As such, it is very inconvenient to determine the paths or nodes over which OAM functionality exists. Users are forced to utilize prior art graphical user interfaces to select a particular node, then select a particular shelf within that node, then select a particular card within that shelf, and finally select a particular port within that card in order to determine if that port is acting as an OAM source or sink. Having to move through so many views is inconvenient to the user, and therefore, undesirable.

Therefore, a need exists for a more efficient means for implementing OAM functionality within communication network.

DETAILED DESCRIPTION OF A PREFERRED EMBODIMENT

Figure 1:
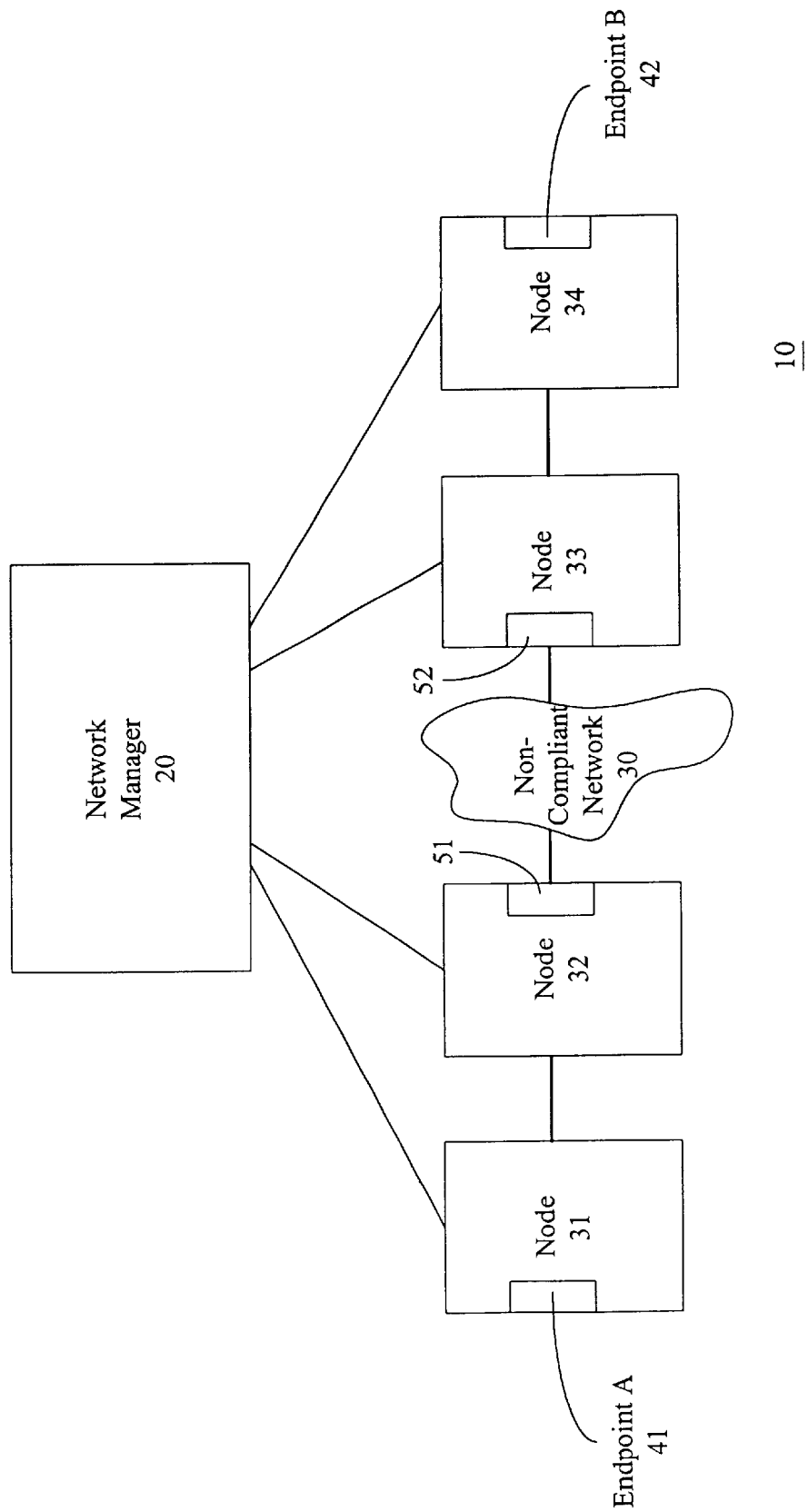
FIG. 1 illustrates a block diagram of a communication network in accordance with a particular embodiment of the present invention.

Generally, the present invention provides a method and apparatus for network management support of OAM functionality in a communication network. The network manager receives OAM configuration information for a path or logical link that includes a plurality of path points. For each path point of the plurality of path points, the network manager determines, based on the configuration of the network, if the path point is to serve as an OAM source or sink for the desired OAM functional path. Based on this determination, the network manager generates OAM configuration commands for the selected path points that are to serve as OAM sources and sinks. These OAM configuration commands are then provided to the corresponding path points such that the appropriate OAM sources and sinks are established. Interaction with the network manager may be facilitated through the use of a graphical user interface that accepts OAM configuration information as well as provides detailed visual information as to current OAM sources, sinks, and intermediate path points. If the network manager determines that a fault or other occurrence within the network results in a reroute condition that affects a path over which OAM functionality exists, the network manager can automatically reconfigure the various sources and sinks established for the path to ensure that OAM functionality for the path is maintained. Furthermore, the network manager can also generate additional source and sink points that allow for isolation of the particular fault through the use of OAM continuity checking.

By allowing the network manager to supervise and support OAM functionality within the communication network, a great deal of the manual interaction required in prior art systems is eliminated. The graphical user interface simplifies the steps required on the part of a user when configuring paths or logical links to support OAM continuity checking as well as OAM performance monitoring. The graphical user interface also provides visual data that makes the location of various source and sink points associated with OAM segments obvious to the user. Furthermore, because the network manager has a global view as to the current state of various paths or connections within the network, any alterations to a connection or path that result in the need to alter OAM source and sink points can be dealt with automatically such that further user interaction is not required.

Network manager control of OAM setup within the network allows the network manager to ensure that maximum coverage for OAM continuity checking is achieved when the segment over which OAM continuity checking is desired is broken up by non-OAM supporting components.

Furthermore, network manager control allows for the user to configure a path to be a part of a multi-network OAM segment. Such multi-network segments may only include a source or a sink for OAM cells that represents the beginning or the end of the path where the opposite end of the path may be located in another network that is not under the network manager's direct control. As such, the OAM cells may originate or terminate in another network, while still providing OAM coverage over at least a portion of the network that the network manager itself controls.

The invention can be better understood with reference to FIGS. 1–6. FIG. 1 illustrates a communication network 10 that includes a plurality of nodes 31–34 that are controlled by a network manager 20. The network manager is responsible for configuring the various nodes 31–34 to support the set up of various paths or logical links over which data is to be communicated, as well as being responsible for detecting problems that may arise within the various nodes or links that connect the nodes within the network 10. The network manager 20 may perform a number of functions associated with network management, such as those performed by the 5620 network manager produced by Alcatel Networks, Incorporated of Kanata, Ontario, Canada. Each of the nodes 31–34 supports OAM functionality and therefore can serve as either an OAM cell sink or an OAM cell source. The network manager 20 receives OAM configuration information, preferably from a graphical user interface, and generates OAM configuration commands based on the OAM configuration information received. The network manager 20 sends these configuration commands to the various nodes 31–34 such that OAM sources and sinks are generated at the appropriate points within the network based on the configuration information received.

As is illustrated, the network 10 includes a non-compliant network 30 that is intercoupled with the various nodes 31–34 such that data traversing from endpoint A 41 to endpoint B 42 passes through the non-compliant network 30. In one example, each of the nodes 31–34 is an ATM node that supports OAM functionality. The non-compliant network 30 may be a number of network components of a different protocol, where the different protocol does not support OAM functionality. In other cases, the non-compliant network 30 may include ATM components that do not support OAM functionality. Typically, the ports 51 and 52 of the nodes 32 and 33, respectively, are configured as intercarrier interface (B-ICI) ports to facilitate the connection with the non-compliant network 30. The B-ICI ports break the support for OAM cells and therefore the line cards that support the B-ICI ports often serve as OAM sinks when they are on the upstream side of a non-compliant network, and as OAM sources when they are in the downstream side of a non-compliant network.

As stated above, OAM functionality may include support for both OAM continuity checking as well as OAM performance monitoring. If OAM performance monitoring is desired, the additional requirement that both endpoints of the OAM performance monitoring segment must support OAM functionality in order for performance monitoring to be supported. Also, no B-ICI ports are allowed as intermediate points associated with the nodes between the endpoints. Thus, OAM performance monitoring support between endpoints A 41 and B 42 would not be possible with this limitation. However, OAM performance monitoring could be configured by the network manager to exist between the endpoint A 41 and the port 51 of the node 32. Thus, if the user desires specific performance monitoring information as to traffic flow between endpoint A 41 and the port 51 of node 32, the network manager 20 can configure one or more source and sink pairs within the nodes 31 and 32 such that either unidirectional or bi-directional OAM performance monitoring cell traffic results. Similarly, the network manager 20 can configure performance monitoring support between the port 52 of node 33 and endpoint B 42.

For OAM continuity checking, the segment defined by the user over which OAM continuity checking is desired may be broken into a number of sub-segments if OAM continuity checking cannot be maintained over the entire segment. For example, a user may request OAM continuity checking between endpoint A 41 and endpoint B 42. Although continuity checking between these two points is not possible on the entire segment due to the intervening non-compliant network 30, some level of continuity checking may be configured by the network manager 20 such that a great deal of the segment between endpoint A 41 and endpoint B 42 is covered. Note that the segment defined by endpoints A 41 and B 42 may represent a path, or may only represent a logical link.

If a request for OAM continuity checking support over the segment defined by endpoints A 41 and B 42 is received, the network manager 20 can derive two sub-segments from this segment, where OAM continuity checking support can be provided over each of the sub-segments. The first sub-segment is between the endpoint A 41 and the port 51 of node 32. The second sub-segment is between the port 52 of node 35 and the endpoint B 42. Thus, although OAM continuity checking cannot be provided along the entire segment between endpoints A 41 and B 42 (as no OAM continuity checking is possible within the non-compliant network), the network manager 20 is able to establish OAM continuity checking support over as much as the segment as possible.

Figure 2:
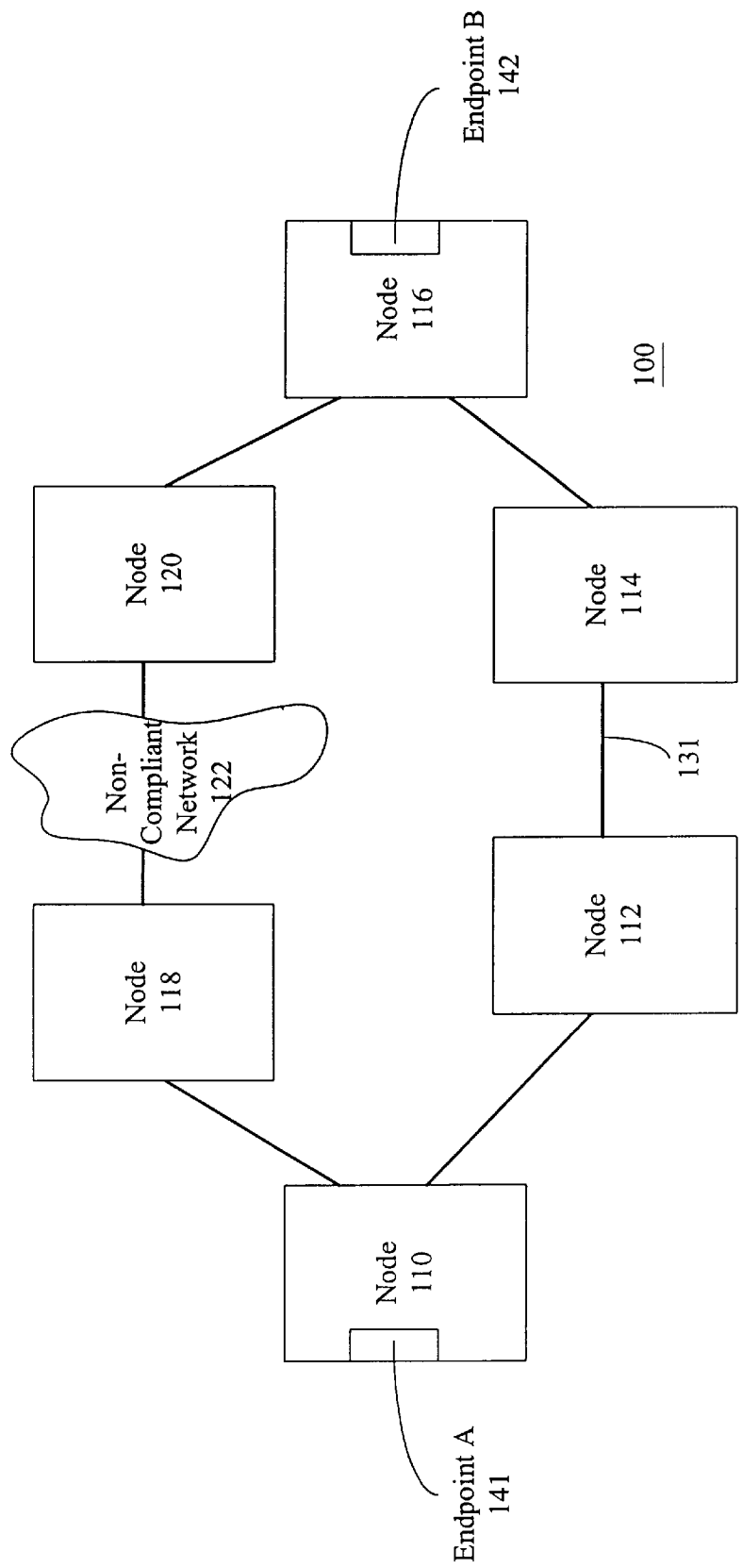
FIG. 2 illustrates a block diagram of another communication network in accordance with a particular embodiment of the present invention.

FIG. 2 illustrates a block diagram of another network 100 that includes a plurality of nodes 110–120 and a non-compliant network 122. Each of the nodes 110–120 is coupled to a network manager such that the network manager 20 described with respect to FIG. 1 above. In one example, a user defines a path within the network 100 between the endpoint A 141, which is included in the node 110, and the endpoint B 142, which is included in the node 116. In the example, the path between endpoint A 141 and endpoint B 142 as defined by the user as a unidirectional path such that cell flow is originated at endpoint A 141 and terminated at endpoint B 142. This initial path may include the nodes 112 and 114. Following configuration of the path, the user may determine that OAM continuity checking is desirable over the path between endpoint A 141 and endpoint B 142. As such, the user defined a segment bounded by endpoint A 141 and endpoint B 142 and indicates that OAM continuity checking is desired over the segment. The definition of the segment and the selection of OAM continuity checking coverage may be performed by the user through the use of a graphical user interface that presents the user with the various options available for OAM support over the segment defined by the user.

For purposes of illustration, the node 110 is assumed to not support any OAM functionality. However, the nodes 112–116 all provide OAM support. The network manager that controls the OAM functionality preferably includes a database that stores path point parameters for each path point, where a path point corresponds to a port in an ingress or egress line card that supports a particular path within a node. These path point parameters indicate whether each path point supports OAM functionality. By referencing this database, the network manager can determine that in order to provide maximum OAM continuity checking coverage for the segment defined by the user, an OAM source is to be established within the node 112 and an OAM sink is to be established within the node 116. With respect to the direction of data flow between the endpoints A 141 and B 142, the source is established within the ingress line card of the node 112 and the sink established within the egress line card of the node 116. Based on this determination, the network manager generates OAM configuration commands that are sent to the nodes 112 and 116 to establish the OAM source and sink.

Following transmission of the OAM configuration commands to the nodes that contain the appropriate path points, the network manager may perform the additional step of verifying that the transmission of the OAM configuration commands to the selected path points was successful. If the OAM configuration command transmission was unsuccessful, an OAM configuration failure notification may be generated, where such a failure notification may be relayed to the user via the graphical user interface (GUI). If the transmission of the OAM configuration command is successful, an OAM configuration confirmation notification may be generated such that the user is notified that the configuration has been successfully performed. This may be communicated via the GUI in a particular form that makes the resulting OAM configuration readily apparent to the user. The GUI is described in additional detail with respect to FIG. 6 below.

Continuing with the example, if a fault occurs at the link 131 that couples the node 112 and the node 114, data traffic between the nodes 112 and 114 is interrupted. The network manager can detect such an interruption in data flow and re-route the path established by the user between endpoints A and B such that a new path that traverses the network 100 from node 110 through node 118, the non-compliant network 122, node 120, and finally to the node 116 is established. Assuming that the user wishes to maintain as much OAM continuity checking as is possible over this newly-created path, the network manager can recognize that new OAM sources and sinks should be created corresponding to this new path, and those corresponding to the old path should be terminated such that they do not interfere with future OAM continuity checking that may be configured within the network. As a result, the network manager generates additional OAM configuration commands such that the source established at node 112 is terminated. Additional configuration commands can cause the sink set up at node 116 to be terminated, however, in some embodiments, it may be preferable to leave this OAM sink in place, as it may serve as the OAM continuity checking cell sink for a sub-segment later established.

Assuming that the nodes 118 and 120 are fully supportive of OAM functionality, two sub-segments can be created to provide maximum OAM continuity checking coverage over the segment between endpoints A 141 and B 142 along the path going through the non-compliant network 122. As mentioned above, the node 110 does not support OAM functionality, and therefore, no OAM sources or sinks are contained within the node 110. With respect to the direction of data flow for the unidirectional path, an OAM source can be created within the ingress line card of the node 118. Because the non-compliant network 122 is not capable of supporting OAM cell traffic, OAM cells sourced within the ingress line card of the node 118 must be sinked within the egress line card of the node 118. Thus, the OAM continuity checking cell source and sink within the node 118 may only provide continuity verification for the switching fabric and other interconnect included within the node 118.

The second sub-segment that can be established along the segment from endpoint A 141 to endpoint B 142 begins in the ingress line card of the node 120 and ends at the egress line card of the node 116. Thus, the appropriate OAM configuration commands can be generated and sent to the nodes 116 and 120 such that a source is created in the ingress line card of the node 120 and a sink is created within the egress line card of the node 116. As mentioned above, the sink that existed in the egress line card of the node 116 before the rerouting of the path was required may be used as the sink for this newly-created sub-segment such that additional command information that terminates this original sink and generates another sink in the same location is not required. In other embodiments, the original sink may be terminated and a new sink generated even though both exists at the same general location.

When the fault is detected at the link 131, the graphical user interface can be used to relay information corresponding to the fault to the user. For instance, a particular color may be used to display the fault such that in one example, the color red is used to indicate a break in the link that is preventing cell traffic from flowing properly.

The network manager may use OAM functionality to detect and isolate the fault at the link 131. The first indication that the network manager receives as to the fault at the link 131 may be the lack of receipt of OAM cells by the OAM sink originally established within the egress line card of the node 116. Such a lack of continuity can indicate that there is a fault somewhere along the segment over which OAM continuity checking is currently supported. In order to isolate this fault, the network manager may reconfigure the OAM continuity checking such that the original continuity checking segment is separated into a number of sub-segments. Each of these sub-segments can then be examined to determine if continuity exists across the sub-segment. Subsequent division of sub-segments into smaller sub-segments is then used to further isolate the fault to a particular node or link.

In the example shown in FIG. 2, upon detection of lack of continuity between the endpoint A 141 and the endpoint B 142, the network manager may reconfigure the source and sink points associated with the segment such that new source and sink points are generated within the node 114 such that the continuity checking is broken into two sub-segments. In one configuration, the first sub-segment verifies continuity from the ingress line card of the node 112 to the ingress line card of the node 114, and the second sub-segment verifies continuity from the ingress line card of the node 114 to the egress line card of the node 116. Based on such a division, the fault will be isolated to the sub-segment between the ingress line card 112 and the ingress line card of the node 114. Further isolation can be achieved by setting up additional source and sink points at the egress line card of the node 112. This will split the sub-segment into two additional sub-segments, where one is wholly within the node 1 12 and the other includes the link 131. This further division can determine that the fault lies along the link 131, thus enabling the network manager to reroute the path and re-establish the various source and sinks for OAM continuity checking for the newly created path.

Figure 3:
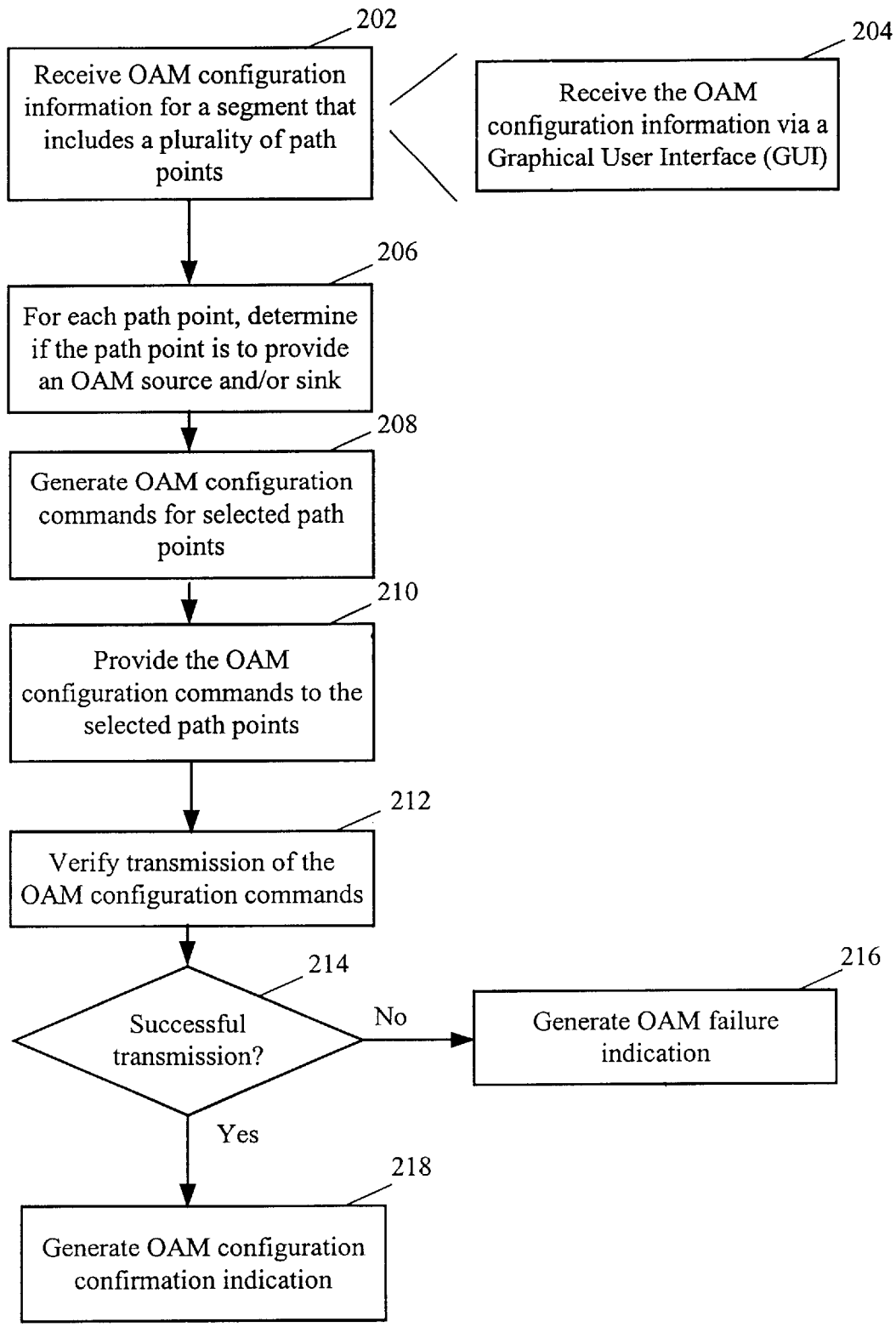
FIG. 3 illustrates a flow diagram of a method for controlling OAM functionality within a network in accordance With the particular embodiment of the present invention.

FIG. 3 illustrates a flow diagram associated with a method for controlling OAM functionality within a network. The method begins at step 202 where OAM configuration information for a segment is received. The segment includes a plurality of path points, which may correspond to an entire path established within the network, or may correspond to only a portion of a path. The OAM configuration information may include an OAM type indication that selects at least one of OAM performance monitoring and OAM continuity checking. The OAM configuration information may be received at step 204 via a GUI that facilitates user configuration of OAM segments and functionality within the network.

At step 206, it is determined for each path point of the plurality of path points along the segment, whether or not each of the path points is to provide at least one of an OAM source and an OAM sink. Such a determination is based on the configuration of the network and path point parameters stored in a database that indicate whether each path point supports OAM functionality. Depending on whether the OAM configuration information indicates that the segment is a unidirectional or bi-directional segment, some path points may serve as an OAM source that generates OAM cells, an OAM sink that terminates OAM cells, or as both an OAM source and an OAM sink in the case of a bi-directional segment.

The determination for each path point if the path point is to serve as an OAM source or an OAM sink may also include determining if each path point is to serve as an intermediate OAM path point. Intermediate OAM path points correspond to path points that exist between an OAM source and an OAM sink. In order to ensure that OAM cells are not sourced or sinked at such intermediate path points, configuration commands may be generated such that any existing source configurations or sink configurations for these intermediate path points are cleared prior to establishment of the OAM sources and sinks associated with the OAM configuration information received at step 202.

In the case of OAM configuration information corresponding to OAM continuity checking, the determination performed at step 206 may include the determination of a plurality of sources and sinks associated with a number of sub-segments. As described above, OAM performance monitoring requires OAM support on the part of both endpoints of the segment. In the case of OAM continuity checking, the segment can be broken into a number of sub-segments, where OAM continuity checking is supported over each of the sub-segments such that at least some continuity checking coverage over the segment is achieved.

At step 208, the appropriate OAM configuration commands are generated corresponding to the selected path points that are to provide the OAM source and sinks. At step 210, the OAM commands are provided to the selected path points such that the OAM sources and sinks are configured.

In some embodiments, verification of the transmission of the configuration commands occurs such that establishment of the OAM functionality is also confirmed. Thus, at step 212, the transmission of the OAM configuration commands to the selected path points is verified. At step 214 it is determined whether or not the transmission of the commands, and thus the configuration of the sources and sinks, was successful. If not, the method proceeds to step 216 where an OAM failure indication is generated. This failure indication may be provided to the user via the GUI, or may result in additional OAM configuration commands being attempted before the user is notified.

If it is determined at step 214 that the transmission of the OAM configuration commands was successful, the method proceeds to step 218. At step 218, an OAM configuration confirmation indication is generated, which may be provided to the user via the GUI.

In some embodiments, the OAM configuration methodology may support multi-network OAM segments. In a multi-network OAM segment, the OAM cells may be sourced or sinked in a network other than the network that is under direct control of the network manager performing the OAM configuration. For example, a network manager may control all of network B, which is coupled to network A. The networks A and B may be coupled by an internetwork service interface (B-ISSI). Network A may include an OAM continuity checking source for the path over which continuity is to be verified, where the path extends across the link between network A and network B. With the source in network A, only an OAM sink is required in network B to complete the segment over which OAM continuity checking is to be verified. By including the capability for the OAM configuration information to indicate that the segment is a portion of a multi-network OAM segment, this may allow the network manager to properly configure an OAM source or sink within the network to serve as a single endpoint for the multi-network OAM segment.

Figure 4:
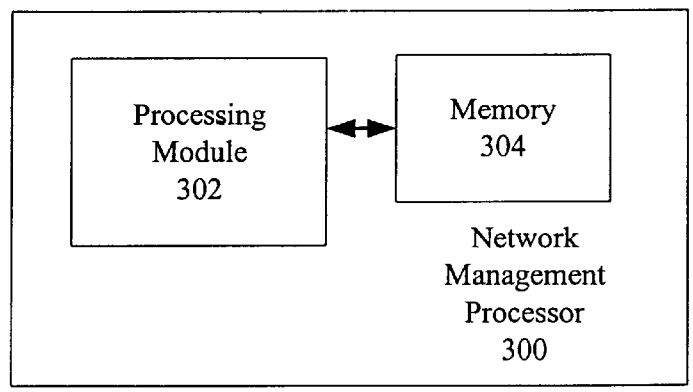
FIG. 4 illustrates a block diagram of a network diagram of a network management processor in accordance with a particular embodiment of the present invention.

FIG. 4 illustrates a block diagram of a network management processor 300 that may be included within a network manager associated with controlling OAM functionality within a network. The network management processor 300 includes a processing module 302 and a memory 304. The processing module 302 may include a single processing entity or a plurality of processing entities. Such a processing entity may be a microprocessor, a microcontroller, a digital signal processor, a state machine, logic circuitry, or any device that processes information based on operational or programming instructions.

The memory 304 may be a single memory device or a plurality of memory devices. Such a memory device may be a read-only memory device, a random access memory device, a floppy disk, a hard drive memory, or any device that stores digital information. Note that when the processing module 302 has one or more of its functions performed by a state machine or logic circuitry, the memory containing the corresponding operational instructions is embedded within the state machine or logic circuitry.

The memory 304 stores programming or operational instructions that allow the processing module 302 to perform at least portions of the method illustrated in FIG. 3. Thus, the operational instructions stored within the memory 304, when executed by the processing module 302, cause the processing module 302 to perform functions associated with configuring OAM sources and sinks within the communication network. In the case where the network management processor 300 stores a database that is referenced to determine the path point parameters that indicate whether or not either path point within the network supports OAM functionality, such a database may be stored in the memory 304.

Figure 5:
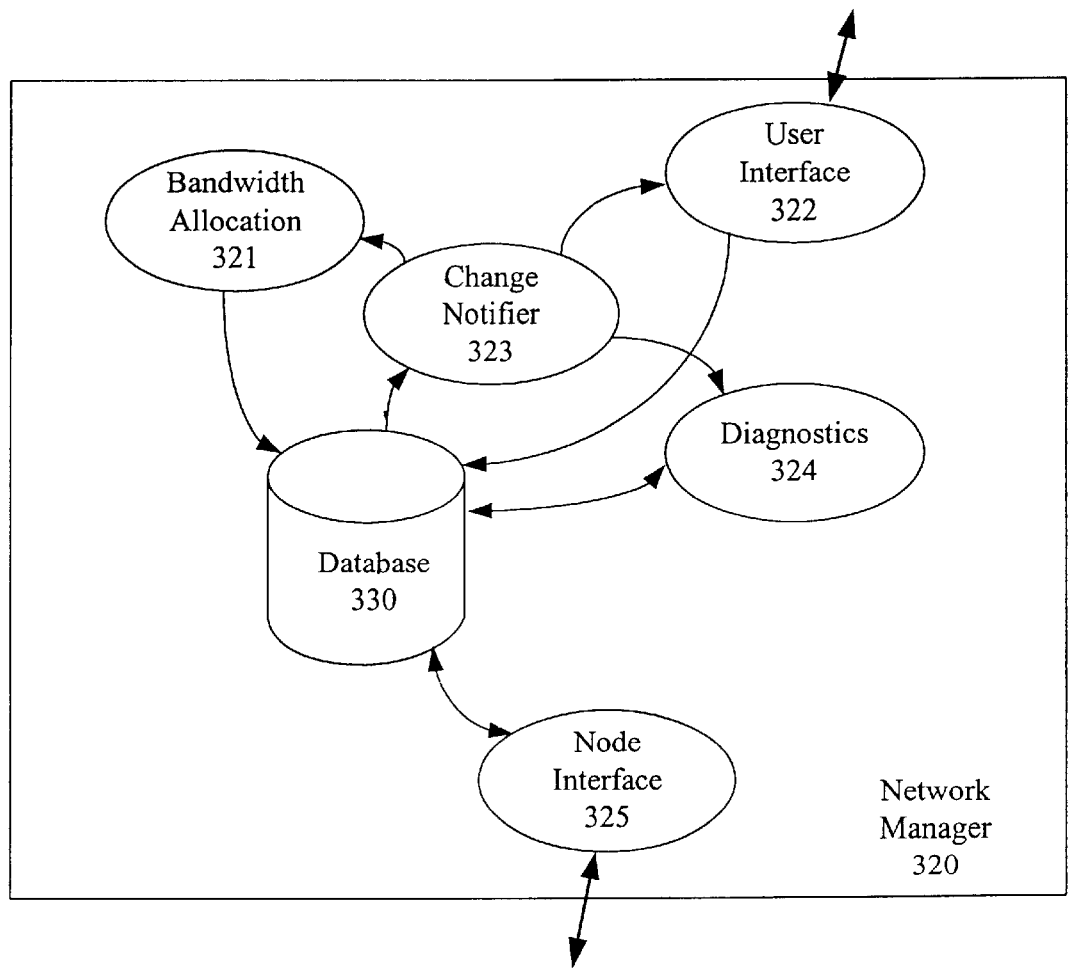
FIG. 5 illustrates a block diagram of a network manager and its various components in accordance with a particular embodiment of the present invention.

FIG. 5 includes a graphical representation of the various component entities within a network manager 320 that may perform various functions associated with OAM functionality configuration. The network manager 320 is shown to include a database 330 and a number of processes 321–325 that interact with each other and the database in order to generate information provided to a user as well as configuration commands provided to various path points included within nodes of the network that the network manager 320 controls.

The user interface process 322 receives OAM configuration information from a user, where such information may be provided via a GUI. The GUI may also serve as a means for communicating the results of configuration requests back to the user such that the user understands the current OAM functionality as it exists within various segments included within the network. In some embodiments, when OAM performance monitoring support is desired, the graphical user interface may be set up such that if the endpoints for a particular path do not support OAM functionality, the OAM performance monitoring option will not be available to the user. Additional details regarding the GUI are provided in the discussion of FIG. 6 below.

The node interface 325 interacts with the various nodes and updates the database 330, where the database 330 stores information regarding the various interconnections between nodes, the current state of OAM sources and sinks within the network, etc. Thus, the node interface 325 is responsible for providing configuration commands to the various nodes and for determining whether or not the nodes respond appropriately to those commands. For example, if a configuration command is provided to a node with the expectation that confirmation of execution of the command is to be received by the node interface 325, and no such confirmation is received, the node interface 325 may update the database 330 to indicate that the command was not properly executed.

The database 330 communicates with the change notifier 323 such that when something within the database changes, the change notifier 323 communicates the change to the appropriate other processes that are running within the network manager 320. For example, if the node interface 325 determines that a configuration command was properly executed such that OAM performance monitoring now is supported over a particular segment, it will update the database 330 to reflect this coverage. The database 330 flags the change to the change notifier 323, which relays the appropriate information to the user interface 322 such that the user interface 322 can notify the user as to the performance monitoring coverage now present within the network.

The diagnostics process 324 controls the insertion of the various OAM sources and sinks within the network. The diagnostics process 324 does this based on new requests corresponding to new paths within the network or to a new OAM support request corresponding to an existing path. In other cases, the OAM sources and sinks may be established to correspond to a new path that is just being connected based on a request received from the bandwidth allocation process 321, where the bandwidth allocation process 321 stores pending paths requests that cannot initially be established due to bandwidth limitations within the network. Thus, when enough bandwidth is freed up such that a request can be processed, the OAM functionality associated with that path that is also pending is configured by the diagnostics process 324.

The diagnostics process 324 utilizes the information included in the database as to how the network is configured to determine where support for OAM sources and sinks is available. Based on this determination, the diagnostics process 324 determines where the appropriate sources and sinks are placed for each segment over which OAM support is desired.

The diagnostics process 324 may cause the configuration commands provided to the nodes to be generated by setting up command records within the database 330. Each command record may correspond to a particular source or sink point within a node in the network. The change notifier 323 detects the new command records and flags the node interface 325. The node interface 325 can then fetch these command records from the database and issue the proper commands such that the sources and sinks are established. Such configuration commands can include the direction that the OAM cells should be sent for an OAM source, how often such cells should be generated, what type of OAM cells are to be generated, etc. Thus, configuration commands can include all of the parameters required to obtain the desired OAM coverage, where the various parameters may be determined based on the OAM parameters described in the ATM specification.

Upon issuance of the configuration commands, the node interface 325 monitors the communication with the nodes to ensure that such configuration commands were received by the nodes. Once confirmation has occurred, the database is updated to reflect the execution of the various command records. The diagnostics process can then remove command records that have been successfully completed, or generate new command records when previously established command records are not properly executed.

Figure 6:
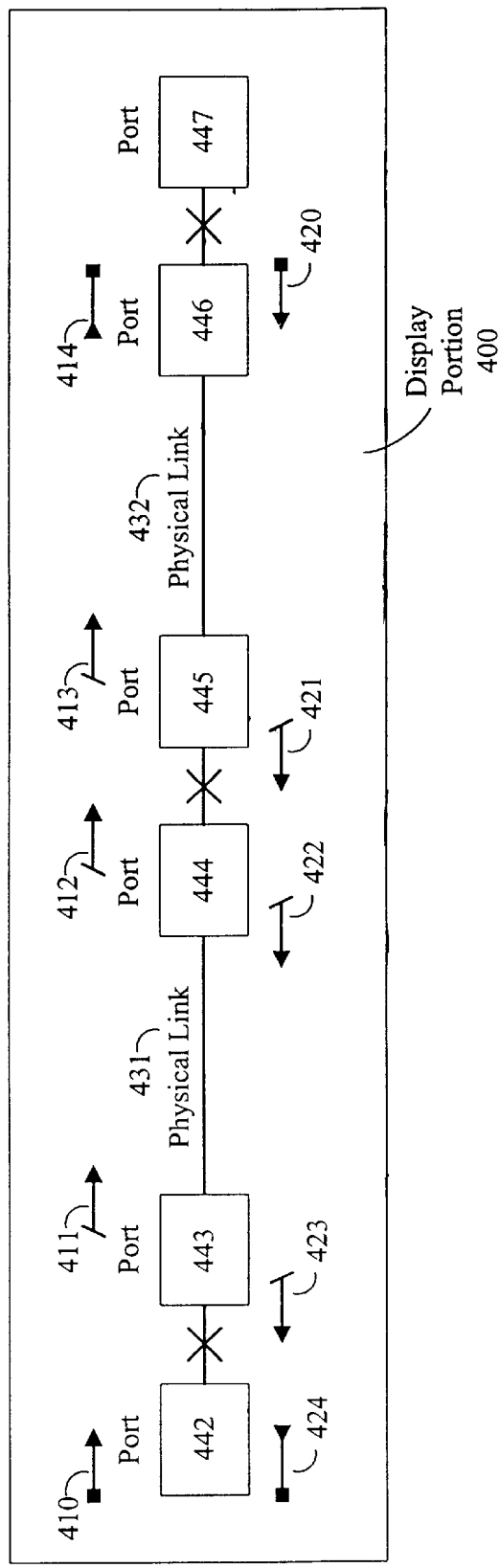
FIG. 6 illustrates a graphical representation of the display associated with a graphical user interface in accordance with a particular embodiment over the present invention.

FIG. 6 illustrates a graphical representation of a display portion 400 that may be associated with the GUI that supports OAM configuration within a network. The particular example illustrated in FIG. 6 may represent an example display image provided to a user for a segment that includes three nodes, each of which is represented with a node icon, which may be made up of a number of port icons. The first node includes ports 442 and 443. Port 442 may be on a first line card within the node, whereas the port 443 may be on a second line card, where the first and second line cards are intercoupled via a switching fabric represented by the "X" along the line connecting the port 442 and the port 443. Similarly, the second node includes ports 444 and 445, and the third node includes ports 446 and 447.

The first node is coupled to the second node via a first physical link 431, and the second node is coupled to the third node via a second physical link 432. The labels corresponding to each of the ports 442–447 and the physical links 431–432 may be included in the display portion 400 of the GUI such that the user can readily appreciate where the various ports are located with respect to their corresponding nodes.

In the particular example illustrated, a bi-directional OAM continuity checking segment has been configured. The segment is defined by endpoints corresponding to the port 442 and the port 447. However the port 447 does not support OAM functionality. This may be indicated on the display using a particular color or other icon variant to represent non-OAM supporting ports. As such, the OAM cells used for continuity verification are sourced by the ports 442 (for cells moving left to right) and by the port 446 (for cells moving from right to left).

An OAM source is preferably indicated by the GUI using a dataflow source icon such as the dataflow source icon 410. In the example illustrated, the data flow source icon 410 is displayed using a block accompanied by an arrow pointing away from the block. The icons present above the ports and physical links correspond to cell flow from left to right, whereas the icon below the ports and physical links correspond to cell flow from right to left. Thus, another cell source is indicated by the dataflow source icon 420, where the dataflow source icon 420 corresponds to the cell flow initiated by the port 446.

The dataflow sink icon 414 corresponds to an OAM sink that terminates the cells sourced by the port 442. In the example illustrated, a dataflow sink icon is displayed using a block with an arrow pointed toward the block. The dataflow sink icon 414 corresponds to a sink associated with the OAM cell traffic moving from left to right in the network. A similar dataflow sink icon 424 under the port 442 indicates that cells sourced by the port 446 are sinked within the port 442.

Due to the fact that some segments may include a large number of nodes that require more display space than is present on a typical display screen, a scroll bar may be included at the top or bottom of the display portion 400 such that the user can move along the segment being examined to spot the various sources and sinks associated with the segment.

Because some segments may be very long, intermediate path points associated with the segment may also be represented with a corresponding dataflow intermediate node icon. Examples of this dataflow intermediate node icon for cell traffic moving from left to right are icons 411–413, each of which corresponds to an intermediate path point for OAM cells sourced by the port 442 which are terminated by the sink within the port 446. Similarly, dataflow intermediate node icons 421–423 represent intermediate path points corresponding cell flow from the port 446 to the port 442. The dataflow intermediate node icon used to represent intermediate path points may include a slash followed by an arrow, where the direction of the slash and arrow indicate the cell flow direction.

By providing these icons corresponding to source points, sink points, and intermediate points, a user can readily determine where OAM coverage exists within a particular segment of the network. In some embodiments, different color schemes may be used in conjunction with the icons in order to add more meaning to the display provided by the GUI. For example, a red icon may represent a faulty source/sink, whereas a green icon indicates a functional source/sink. Such a GUI provides many improvements over prior art GUI displays that force a user to click through multiple levels corresponding to each node to determine whether or not an OAM source or an OAM sink was present within the node. Furthermore, such prior art systems did not provide any indication of intermediate path points such that a user would at least be able to determine whether or not the node that they clicked down into was included in an active OAM segment.

The icons and methodology for displaying a representation of dataflow described with respect to FIG. 6 may also be used in communication network applications other than OAM functionality. These other applications may include other diagnostic applications where the icons indicate the dataflow characteristics associated with diagnostic cell flow. Other applications outside of the diagnostics area may also benefit from such a GUT.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling Operation and Management (OAM) functionality within a network, comprising:

receiving OAM configuration information for a segment, wherein the segment includes a plurality of path points;

for each path point of the plurality of path points, determining, based on configuration of the network, if the path point is to provide at least one of an OAM source and an OAM sink, wherein OAM sources generate OAM cells and OAM sinks terminate OAM cells;

generating OAM configuration commands for selected path points, wherein the selected path points are path points which are to provide at least one of an OAM source and an OAM sink; and providing the OAM configuration commands to corresponding path points of the selected path points.

2. The method of claim 1 further comprises:

verifying transmission of the OAM configuration commands to the selected path points;

when transmission of the OAM configuration commands is unsuccessful, generating an OAM configuration failure notification; and when transmission of the OAM configuration commands is successful, generating an OAM configuration confirmation notification.

3. The method of claim 2 further comprises:

displaying verified results of the OAM configuration commands using a Graphical User Interface (GUI).

4. The method of claim 3, wherein displaying further comprises using a first color to indicate successful configuration commands and a second color to indicate unsuccessful configuration commands.

5. The method of claim 3 further comprises monitoring transmission of OAM cells from OAM sources to OAM sinks configured as a result of the configuration information, and when such monitoring determines a OAM fault within the segment, displaying a graphical representation of the OAM fault using the GUI.

6. The method of claim 5 further comprises isolating the OAM fault by establishing at least one of an additional OAM source and an OAM sink.

7. The method of claim 3, wherein the OAM configuration information is received via the GUI.

8. The method of claim 1, wherein the OAM configuration information is sourced by a bandwidth allocation process that stores pending path requests, wherein the segment is included in a formerly pending path request that is established.

9. The method of claim 1, wherein determining for each path point if the path point is to provide at least one of an OAM source and an OAM sink further comprises referencing a database that stores path point parameters, wherein the path point parameters indicate whether each path point supports OAM functionality.

10. The method of claim 1, wherein receiving the OAM configuration information further comprises receiving the OAM configuration information from a user interface.

11. The method of claim 1, wherein the segment for which the OAM configuration information is received is a path or a portion of a path.

12. The method of claim 1, wherein determining for each path point if the path point is to provide at least one of an OAM source and an OAM sink further comprises determining for each path point if the path point is to serve as an intermediate OAM path point, wherein when the path point is to serve as the intermediate path point any existing OAM source configurations and OAM sink configurations are cleared for the path point.

13. The method of claim 1, wherein the OAM configuration information includes an OAM type indication that selects at least one of OAM performance monitoring and OAM continuity checking.

14. The method of claim 13, wherein when the OAM configuration information indicates that the OAM type is OAM continuity checking, the selected path points include a plurality of OAM sources and a plurality of OAM sinks such that the segment is broken into a plurality of OAM continuity checking sub-segments.

15. The method of claim 1 further comprises, after providing the OAM configuration commands:
   detecting a change in the network configuration that results in the segment being changed to produce a changed segment, and
   reconfiguring the OAM sources and sinks along the segment and the changed segment.

16. The method of claim 1, wherein the OAM configuration information includes an indication that the segment is a portion of a multi-network OAM segment.

17. A network manager that controls Operation and Management (OAM) functionality within a network, comprising:
   a processor;
   memory operably coupled to the processor, wherein the memory stores operating instructions that, when executed by the processor, cause the processor to perform functions that include:
      for each path point of a plurality of path points included in a segment for which OAM configuration information has been received, determining, based on configuration of the network, if the path point is to provide at least one of an OAM source and an OAM sink, wherein OAM sources generate OAM cells and OAM sinks terminate OAM cells;
      generating OAM configuration commands for selected path points, wherein the selected path points are path points which are to provide at least one an OAM source and an OAM sink; and
      providing the OAM configuration commands to corresponding path points of the selected path points.

18. The network manager of claim 17, wherein the operating instructions cause the processor to perform additional functions that include:
   verifying transmission of the OAM configuration commands to the selected path points;
   when transmission of the OAM configuration commands is unsuccessful, generating an OAM configuration failure notification; and
   when transmission of the OAM configuration commands is successful, generating an OAM configuration confirmation notification.

19. The network manager of claim 18, wherein the processor supports a Graphical User Interface (GUI) and wherein the operating instructions cause the processor to perform an additional function of displaying verified results of the OAM configuration commands using the GUI.

20. The network manager of claim 19, wherein the OAM configuration information is received by the processor via the GUI.

21. The network manager of claim 17, wherein the processor performs the function of determining for each path point if the path point is to provide at least one of an OAM source and an OAM sink by referencing a database that stores path point parameters, wherein the path point parameters indicate whether each path point supports OAM functionality.

22. The network manager of claim 21, wherein the database is stored in the memory.

23. The network manager of claim 17, wherein the OAM configuration information includes an OAM type indication that selects at least one of OAM performance monitoring and OAM continuity checking.

24. The network manager of claim 23, wherein when the OAM configuration information indicates that the OAM type is OAM continuity checking, the selected path points include a plurality of OAM sources and a plurality of OAM sinks such that the segment is broken into a plurality of OAM continuity checking sub-segments.

25. The network manager of claim 17, wherein the operating instructions cause the processor to perform additional functions that include, after providing the OAM configuration commands:
   detecting a change in the network configuration that results in the segment being changed to produce a changed segment, and
   reconfiguring the OAM sources and sinks along the segment and the changed segment.

26. A network that supports network management control of Operation and Management (OAM) functionality within the network, comprising:
   a network manager that receives OAM configuration information and generates OAM configuration commands based on the OAM configuration information received; and
   a plurality of nodes operably coupled to the network manager, wherein at least a portion of the plurality of nodes are configured by the OAM configuration commands generated by the network manager such that at least one of an OAM source and an OAM sink is created within the network.

27. The network of claim 26, wherein the OAM configuration information is provided to the network manager via a Graphical User Interface (GUI).

28. The network of claim 27, wherein the network manager verifies execution of the configuration commands and provides verification information to the GUI for display.

29. The network of claim 26, wherein upon detection of a fault in the network, the network manager generates additional OAM configuration commands that are provided to at least a portion of the plurality of nodes in order to isolate the fault.

30. The network of claim 26, wherein the OAM configuration information includes at least one of OAM continuity checking configuration information and OAM performance monitoring configuration information.

31. The network of claim 30, wherein for OAM continuity checking configuration that corresponds to a segment within the network, the network manager generates a plurality of sets of OAM configuration commands, wherein each set of OAM configuration commands includes an OAM source configuration command and an OAM sink configuration command corresponding to a sub-segment of the segment.

32. The network of claim 26, wherein the network manager includes a database that indicates OAM functionality support parameters corresponding to each node of the plurality of nodes, wherein the network manager generates the OAM configuration commands based on the OAM functionality support parameters and the OAM configuration information received.

33. The network of claim 26, wherein when the network manager determines a change in the network that affects currently established OAM functionality, the network manager generates additional OAM configuration commands that results in modified OAM functionality that is compatible with the change in the network.

* * * * *